Feb. 26, 1952     R. S. HAVENHILL ET AL     2,587,156
ELECTRIC FIELD STRENGTH MEASUREMENT
Filed Dec. 28, 1948
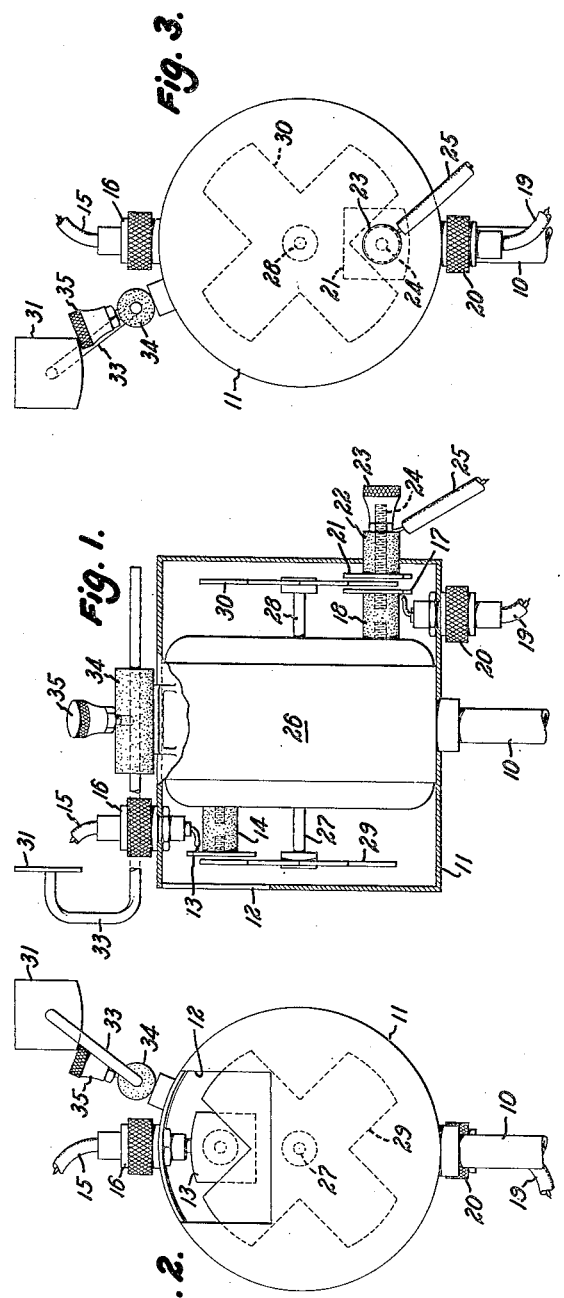
Inventors
Robert S. Havenhill and
Loyd E. Carlson,
By Stowell & Evans,
Attorneys.

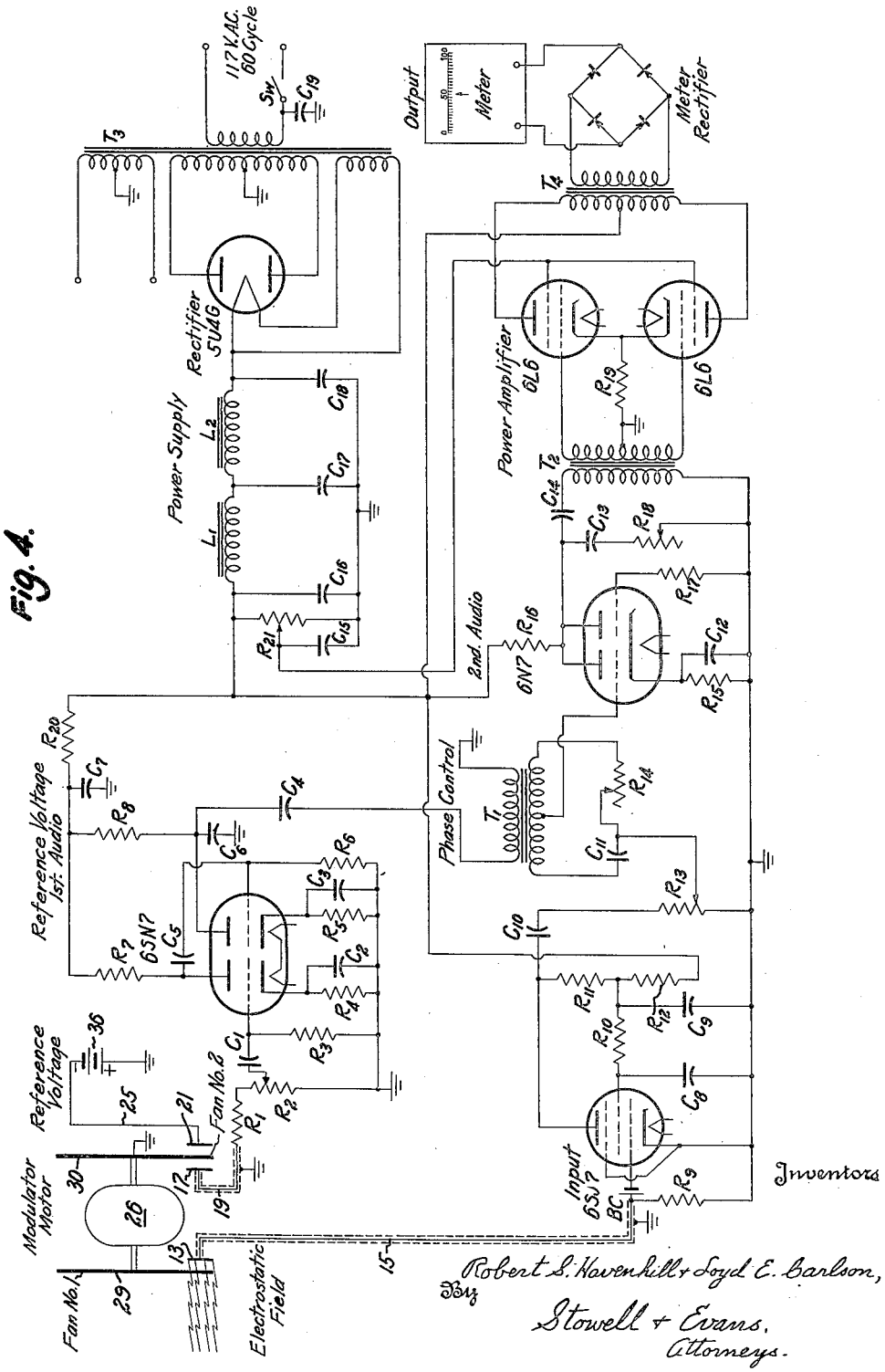

Patented Feb. 26, 1952

2,587,156

UNITED STATES PATENT OFFICE 2,587,156

ELECTRIC FIELD STRENGTH MEASUREMENT

Robert Samuel Havenhill, Beaver, and Loyd E. Carlson, Monaca, Pa., assignors to St. Joseph Lead Company, New York, N. Y., a corporation of New York Application December 28, 1948, Serial No. 67,734

5 Claims. (Cl. 171—95)

This invention relates to a device for measuring the strength of and indicating the polarity of electric fields.

An object of the invention is to provide a device of this character that is highly sensitive and that gives precise measurements of the strength and polarity of electrostatic fields.

Another object is to provide in electrostatic field measuring apparatus a field sensing head constructed in the form of a relatively small unit that is conveniently placed in locations where measurements are made, that is rugged and that can be successfully employed by relatively unskilled operators.

Another object is to provide in such apparatus an electronic circuit for amplifying and combining a signal proportional to field strength with a reference signal to provide a resultant signal proportional to the magnitude of the field and indicative of its polarity.

Another object is to provide an electrostatic field measuring instrument having high input impedance and low input capacity whereby the field being measured is substantially unaltered by the presence of the instrument.

These and other objects and advantages of the invention are accomplished in apparatus measuring the strength and indicating the polarity of electrostatic fields including a first electrode adapted to be exposed to the field to be measured, a second electrode isolated from the first electrode and exposed to an electric field of preselected strength, a first conductive blade member cutting the field impinging on the first electrode at an audio frequency, a second conductive blade member cutting the field impinging on the second electrode in synchronism with the first blade member, means including a high impedance low capacitance input circuit for amplifying the audio frequency signal induced on the first electrode, independent means for amplifying the audio frequency signal induced on the second electrode, a network including a variable impedance element for shifting the phase of one of the amplified signals, means for combining the signals, means for rectifying the combined signal, and an output meter responsive to the output of the rectifying means.

The invention will be described with greater particularity, and other of its aims, objects and advantages will be in part apparent and in part pointed out in the following detailed description taken in connection with the accompanying drawings, wherein:

Fig. 1 is an axial sectional view of an electrostatic field sensitive modulator head forming a part of the complete measuring instrument of the invention;

Fig. 2 is a left side view of the head shown in Fig. 1;

Fig. 3 is a right side view thereof; and

Fig. 4 is a diagrammatic representation of the complete measuring instrument.

Referring to the drawings, particularly to Figs. 1 through 3, the modulator head shown has an arm 10 by which the head is mounted in an electrostatic field under investigation. A metallic cylindrical casing 11 is carried by the mounting arm. The casing has an aperture 12 in one end thereof through which an electrode 13 mounted on an insulator 14 is exposed to an unknown electrostatic field outside the casing. The casing acts as a shield to protect the contents thereof from the influence of the circumambient electrostatic field, and the aperture allows the field to act on the electrode 13. A shielded cable 15 passes through a bushing 16 and is connected to the electrode 13.

Within the casing 11, and shielded from outside effects, is a second electrode 17 similar to the electrode 13 and similarly mounted on an insulating support 18. A shielded cable 19, passing through bushing 20 is connected to the second electrode 17.

A third electrode 21, similar to the second electrode 17, is mounted in parallel spaced relation thereto on the insulating support 22 that projects through the wall of the casing 11 and has an outer terminal 23 electrically connected to the third electrode 21 through screw 24. An insulated wire or conductor 25 is shown connected to the outer terminal.

Mounted interiorly and centrally of the head casing 11 is an electric motor 26 having common shaft sections 27 and 28 extending axially of the casing on opposite sides of the motor. Shaft section 27 carries a bladed fan-shaped conductive rotor member 29 having four radially extending blades that pass between the electrode 13 and the aperture 12 to alternately obscure and expose the electrode as the bladed member is rotated.

Shaft section 28 has a similar four bladed rotor 30 mounted thereon and positioned to rotate through the gap between electrodes 17 and 21.

It will be seen that as the shaft sections 27 and 28 are rotated in unison, the blades of rotors 29 and 30 obscure and expose the electrodes 13 and 17 at the same rate and in phase with each other.

The modulator head is provided with an external calibrating electrode 31 mounted on a U-shaped rod 33, journalled in an insulating mounting bracket 34, having a combined set screw and terminal post 35. As shown in the drawings, the calibrating electrode is in an inactive position, but it will be seen that, by loosening the set screw 35, the electrode may be swung into and locked in a position where it faces the electrode 13 through the aperture 12. Calibration will be described more fully hereinafter.

Referring to Fig. 4, the modulator head including the rotors, electrodes, and associated elements, is identified in the upper left-hand corner of the drawing. The electrostatic field to be measured is shown as impinging upon the electrode 13; and it will be understood that, as the bladed member 29 is rotated, the field is alternately cut and reestablished at the electrode 13 to produce a fluctuating voltage thereon, the magnitude of which voltage depends upon field strength and the sign of which depends upon field polarity.

An independent fluctuating reference voltage is established on the electrode 17 by similarly cutting with the rotor 30 an electric field emanating from the electrode 21. The reference field is generated from a fixed voltage applied to the electrode 21 by means of a battery 36, one terminal of which is connected to the electrode 21 through conductor 25 and the other terminal of which is grounded. Typically the battery 36 is a 90 volt dry primary battery the negative terminal of which is connected to the electrode 21.

The voltages generated on electrodes 17 and 13 are substantially in phase and the cyclic rate thereof, as determined by the speed of motor 26 and the number of rotor blades, is preferably in the audio range, say from 30 cycles per second to 15,000 cycles per second. These voltages are amplified through separate amplifying channels. The phase of at least one of the voltages is varied through the necessary angle to bring the amplified voltages into precise phase with each other. The unknown voltage is then combined with the reference voltage to give a resultant voltage proportional to the sum or difference of the two. The resultant is thereafter amplified, if necessary, rectified, and the rectified voltage is applied to a meter to give an indication of the magnitude and polarity of the unknown voltage. The meter may be calibrated to read directly in terms of volts per inch field strength and the direction of excursion of the indicator may denote sign.

One form of electronic apparatus for carrying out the foregoing steps is illustrated diagrammatically in Fig. 4. In this apparatus, the reference voltage, as developed across the lower portion of resistor $R_2$, is amplified through the reference voltage first audio stage including a duo-triode vacuum tube such as a 6SN7. The amplified output of this stage is fed to the primary winding of the combining transformer $T_1$ and thence to ground.

The unknown voltage, as developed across the high value resistor $R_9$ is amplified through the input stage typically including the pentode 6SJ7. The output of this stage is applied to the phase shifting network, including the secondary winding of the transformer $T_1$, the condenser $C_{11}$ and the potentiometer $R_{14}$, through a coupling condenser $C_{10}$ and a gain control $R_{13}$. $R_{18}$ is a secondary phase control to aid in obtaining proper phase adjustment.

The amplified unknown and reference signals are combined in the secondary of the transformer $T_1$ to provide a resultant signal that is applied to the grid of the double triode 6N7 of the second audio stage.

The output of the second audio stage is passed through the interstage transformer $T_2$ to the power amplifier including two beam-power amplifier tubes of the 6L6 type in push-pull relation.

The thus amplified resultant signal is fed through the output transformer $T_4$ to the full wave selenium rectifier and the rectified signal is applied to the output meter.

The power supply illustrated is typical of those commonly employed in the radio and electronics art. Conventional connections to tube heaters are not known.

Although, in the foregoing description, only the more important relationships of the several components of the electronic apparatus have been discussed, the following table presents typical constants and values of the several parts of the apparatus. It is believed unnecessary to specify the function of each resistor and condenser where these parts serve the usual purposes of current limiting, coupling and by-passing

TABLE

*Transformers*

$T_1$—Audio transformer
$T_2$—Interstage transformer
$T_3$—Power transformer
$T_4$—Output transformer—8 ohm secondary
Meter rectifier—Selenium—10 volt, 250 ma.
Output meter—Esterline Angus recorder—100 mv., 250 ma., D. C. full scale
B. C.—1 volt bias cell

*Controls*

$R_2$ —Reference voltage gain control, 0.5 meg. potentiometer
$R_{13}$—Input gain control, 1 meg. potentiometer
$R_{14}$—Phase control, 0.5 meg. potentiometer
$R_{18}$—Tone control, secondary phase control, 100 k. potentiometer

*Condensers*

| | Mf. |
|---|---|
| $C_1C_4C_5C_8C_{10}C_{19}$ | 0.1 |
| $C_2C_3$ | 10 |
| $C_6$ | 0.0015 |
| $C_7C_9C_{15}$ | 8 |
| $C_{11}$ | 0.005 |
| $C_{12}$ | 25 |
| $C_{13}$ | 0.05 |
| $C_{14}$ | 0.25 |
| $C_{16}C_{17}C_{18}$ | 20 |

*Resistors*

| | | |
|---|---|---|
| $R_1R_3$ | k | 250 |
| $R_4$ | k | 2.5 |
| $R_5$ | k | 1 |
| $R_6$ | meg | 0.5 |
| $R_7R_8$ | k | 50 |
| $R_9$ | meg | 5 |
| $R_{10}$ | meg | 1 |
| $R_{11}$ | k | 200 |
| $R_{12}$ | k | 24 |
| $R_{15}$ | ohms | 2,250 |
| $R_{16}$ | k | 75 |
| $R_{17}$ | k | 240 |
| $R_{19}$ | ohms | 300 |
| $R_{20}$ | k | 51 |

$R_{21}$—15 k. voltage divider tapped at 10 k.

The constants given in the foregoing table are merely exemplary and may be varied within reasonable limits without substantially affecting performance of the apparatus.

In operation, the power supply is energized by closing the switch SW in the input to the transformer T₃ and the motor 26 is started. The speed of the motor preferably is such that the fields impinging on the electrodes 13 and 17 are cut at a frequency of 300 cycles per second. The magnitude of the reference voltage is adjusted by means of the volume control R₂ so that the output meter reads approximately center scale when no electrostatic field impinges on the electrode 13.

The calibrating electrode 31 is swung to operating position and a voltage approximately equal to that of the electrode 21 is applied thereto to give a change in reading on the output meter. Potentiometers R₁₄ and R₁₈ of the phase control system are adjusted until the meter reads a minimum or a maximum value, depending upon whether the reference and unknown signals are approximately in phase or approximately 180° out of phase. This insures precise phasing of the two signals and compensates for unavoidable misalignment of the bladed members 29 and 30 and for inherent and ambient phase shifting in the amplification stages preceding the combining transformer T₁.

Calibration after preliminary adjustment may be completed using the calibration electrode 31. Knowing the dimensions of the system including electrodes 13 and 31 and the potential applied to the electrode 31, field strength at the electrode 13 can be calculated. By varying the charge impressed on the calibrating electrode and observing corresponding variations in meter reading, the instrument may be calibrated over its full range.

Once the apparatus has been adjusted and calibrated, it is rarely necessary to recalibrate.

The strength and polarity of an unknown electrostatic field is measured by placing the modulator head in the field in the desired position and reading the unknown quantities from the output meter.

From an inspection of Fig. 4, it will be seen that the unknown and reference voltages are applied in series to the grid of the second audio stage. When these voltages are in phase, they are additive; when 180° out of phase, as is the case when the polarity of the electrostatic field is positive, they will buck each other and their difference is recorded on the output meter. If they are of exactly the same magnitude when in phase, the output reading is twice the value of either one; when 180° out of phase, the output meter reads zero.

It will be seen that the present invention provides an electrostatic field measuring instrument of high sensitivity that not only measures field strength with a high degree of exactitude, but also indicates field polarity.

We claim:

1. Apparatus for measuring the strength and automatically indicating the polarity of electric fields comprising an electrode adapted to be exposed to the field to be measured, a second electrode exposed to an electric field of preselected constant strength, a conductive blade member cutting the field impinging on said first electrode at an audio frequency, a conductive blade member cutting the field impinging on said second electrode at an audio frequency, means for isolating and separately detecting the voltages induced on said electrode members, means for combining said separately detected voltages to provide a resultant signal, and an output meter responsive to the resultant signal.

2. Apparatus for measuring the strength and automatically indicating the polarity of electric fields comprising an electrode adapted to be exposed to the field to be measured, a second electrode exposed to an electric field of preselected constant strength, a conductive blade member cutting the field impinging on said first electrode at an audio frequency, a conductive blade member cutting the field impinging on said second electrode at an audio frequency, means for isolating and separately detecting the voltages induced on said electrode members, a network for shifting the phase of one of said voltages, means for combining said partially detected voltages to provide a resultant signal, and an output meter responsive to the resultant signal.

3. Apparatus for measuring the strength and automatically indicating the polarity of electric fields comprising an electrode adapted to be exposed to the field to be measured, a second electrode exposed to an electric field of preselected constant strength, a conductive blade member cutting the field impinging on said first electrode at an audio frequency, a conductive blade member cutting the field impinging on said second electrode at an audio frequency, means for isolating and separately detecting the voltages induced on said electrode members, a network including a variable impedance element for shifting the phase of one of said voltages, means for combining said separately detected voltages to provide a resultant signal, and an output meter responsive to the resultant signal.

4. Apparatus for measuring the strength and automatically indicating the polarity of electric fields comprising an electrode adapted to be exposed to the field to be measured, a second electrode exposed to an electric field of preselected constant strength, a conductive blade member cutting the field impinging on said first electrode at an audio frequency, a conductive blade member cutting the field impinging on said second electrode at an audio frequency, means for isolating and separately detecting the voltages induced on said electrode members, a network including a variable resistance element for shifting the phase of the amplified voltage induced on the first of said electrode members, means for combining said separately detected voltages to provide a resultant signal, and an output meter responsive to the output of said amplifying means.

5. Apparatus for measuring the strength and automatically indicating the polarity of electric fields comprising a first electrode adapted to be exposed to the field to be measured, a second electrode isolated from said first electrode and exposed to an electric field of preselected constant strength, a first conductive blade member cutting the field impinging on said first electrode at an audio frequency, a second conductive blade member cutting the field impinging on said second electrode in synchronism with said first blade member, means including a high impedance low capacitance input circuit for detecting the audio frequency signal induced on said first electrode, independent means for detecting the audio frequency signal induced on said second electrode, a network including a variable impedance element for synchronizing the phase of one of said detected signals with the other, means for combining said signals, means for amplifying and rectifying the phase combined signal, and an output meter responsive to the output of said rectifying means.

ROBERT SAMUEL HAVENHILL.
LOYD E. CARLSON.

REFERENCES CITED

The following references are of record in the file of this patent:

UNITED STATES PATENTS

| Number | Name | Date |
|---|---|---|
| 1,540,317 | Craft et al. | June 2, 1925 |
| 2,032,932 | Hauffe et al. | Mar. 3, 1936 |
| 2,388,105 | Wilson | Oct. 30, 1945 |
| 2,449,068 | Gunn | Sept. 14, 1948 |
| 2,487,603 | Scoles | Nov. 8, 1949 |
| 2,510,347 | Perkins | June 6, 1950 |